US012802149B2

(12) United States Patent
Embry et al.

(10) Patent No.: US 12,802,149 B2
(45) Date of Patent: Nov. 17, 2026

(54) SYSTEM AND METHOD FOR IDENTIFICATION DOCUMENT VERIFICATION

(71) Applicant: Intellicheck, Inc., Melville, NY (US)

(72) Inventors: Russell T. Embry, Melville, NY (US); Frank P. Lubin, Port Saint Lucie, FL (US); Steven Paul Dwyer, Taylors, SC (US)

(73) Assignee: Intellicheck, Inc., Melville, NY (US)

( * ) Notice: Subject to any disclaimer, the term of this patent is extended or adjusted under 35 U.S.C. 154(b) by 255 days.

(21) Appl. No.: 18/176,328

(22) Filed: Feb. 28, 2023

(65) Prior Publication Data

US 2024/0289908 A1 Aug. 29, 2024

(51) Int. Cl.
*G06Q 10/10* (2023.01)
*G06Q 40/08* (2012.01)
*G06Q 50/26* (2012.01)

(52) U.S. Cl.
CPC .................................. *G06Q 50/265* (2013.01)

(58) Field of Classification Search
CPC .................................................... G06Q 50/265
USPC .................................................. 705/1.1–912
See application file for complete search history.

(56) References Cited

U.S. PATENT DOCUMENTS 9,058,580 B1 * 6/2015 Amtrup ............ G06Q 10/06316
10,142,338 B2 * 11/2018 Hall .................... H04L 63/0838
10,225,088 B2 * 3/2019 Abt, Jr. .................... G06F 21/31
11,063,770 B1 * 7/2021 Peng ........................ G06F 21/64
11,528,267 B2 * 12/2022 Ports, III ............ H04L 63/0861
12,021,861 B2 * 6/2024 Allen .................. H04L 63/0853
12,306,994 B2 * 5/2025 Wilbert ..................... H04L 9/32
2006/0184575 A1 * 8/2006 Singleton ............... G06Q 50/26
2015/0170085 A1 * 6/2015 Amtrup ................ H04N 1/3878
705/7.26
2017/0324750 A1 * 11/2017 Khan .................. H04W 12/068
2019/0068378 A1 * 2/2019 Abt, Jr. ................. H04L 9/3226
2020/0153606 A1 * 5/2020 Li ......................... H04L 9/3239

(Continued)

OTHER PUBLICATIONS

Terbu, Lodderstedt, Yasuda, Lemmon, and Looker, "OpenID for Verifiable Presentations," openid-4-verifiable-presentations-1_0-13, pp. 1-53, Sep. 6, 2022. https://openid.net/specs/openid-4-verifiable-presentations-1_0-13.html#name-table-of-contents (Year: 2022).*

*Primary Examiner* — Jonathan P Ouellette
(74) *Attorney, Agent, or Firm* — Greenberg Traurig

(57) ABSTRACT

A computer device may include a memory. A computer device may include a processor, wherein the processor is configured to: receive a versioned request for verification of an identification document, determine data requests needed to respond to the versioned request, determine whether all responses have been received for the data requests, in response to determining all responses have not been received for the data requests, determining whether all data requests have been submitted, in response to determining all data requests have not been submitted, submitting at least one of the remaining data requests that can be submitted to one or more data analyzers, in response to determining all responses have been received for the data requests, formats the response according to a format corresponding to the versioned request; and outputs the formatted response.

21 Claims, 4 Drawing Sheets

(56) References Cited

U.S. PATENT DOCUMENTS

| | | | | |
|---|---|---|---|---|
| 2023/0199028 A1* | 6/2023 | Ho | ...................... | G06F 16/2458 726/1 |
| 2024/0321015 A1* | 9/2024 | Antrim | ................... | G06F 16/54 |

* cited by examiner

SYSTEM AND METHOD FOR IDENTIFICATION DOCUMENT VERIFICATION

FIELD OF THE TECHNOLOGY

At least some embodiments disclosed herein relate generally to verification of documents. More particularly, the embodiments relate to a system and method for identifying fraudulent documents.

BACKGROUND

The problem of rampant and readily available fake identification documents, more particularly, driver licenses and other identification documents, has caused many retailers fines, loss of revenue by retailers and other institutions such as financial institutions, and challenges by law enforcement to keep age restricted products from underaged individuals. Over the course of years, various attempts have been made to prevent or detect the use of fake identification documents, but not with a great deal of success. To help prevent the use of fake identification documents, motor vehicle authorities have been working on and refining a comprehensive framework of minimum requirements with recommendations to enhance and improve the security and uniformity of driver license documents in North America. These new driver licenses and other identification documents have embedded coded, or even encrypted coded information, with machine readable formats that conform to various standards.

BRIEF DESCRIPTION OF THE DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

Like reference numbers represent like parts throughout.

DETAILED DESCRIPTION

Fraudulent actors may use a synthetic identity to create an account, steal a real identity to get account access, or return a product that they did not buy. After fraudulent activity, the damage to a business can include stolen products or money, and a damaged reputation. On the consumer side, an individual has to reclaim her identity and rebuild from the damage the fraudulent actors caused. Institutions are faced with regulations that require due diligence to verify the identities and risks posed by their customers. However, manually verifying the identity can be slow, expensive, and inaccurate. Fraudulent identification can be accurate in appearance such that checking IDs using the human eye may not be effective. The consequences of non-compliance are significant fines or interruptions to business.

Identity documents such as, but not limited to, government-issued driver's licenses and identification cards, passports, international identification cards, tribal identification cards, military identification cards, permanent resident cards, welfare/Medicaid cards, health cards, employment authorization cards, or the like, are often subject to counterfeiting attempts. Systems and methods described herein can aid in identifying counterfeit documents.

In some embodiments, the systems and methods can be applied to physical identification documents. In other embodiments, the systems and methods can be applied to electronic identification documents. In some embodiments, the electronic identification document can include combinations such as a password and a self-photograph (i.e., a selfie) or the like. In some embodiments, the electronic identification document can include a digital representation of a physical identification document and be contained in, for example, a digital wallet or a digital identification application.

In some embodiments, the identification document can be received by a server over a network. In some embodiments, the identification document can be received by a user device and processed by the user device. In some embodiments, the user device can be in electronic communication with a server to distribute the processing.

Figure 1:
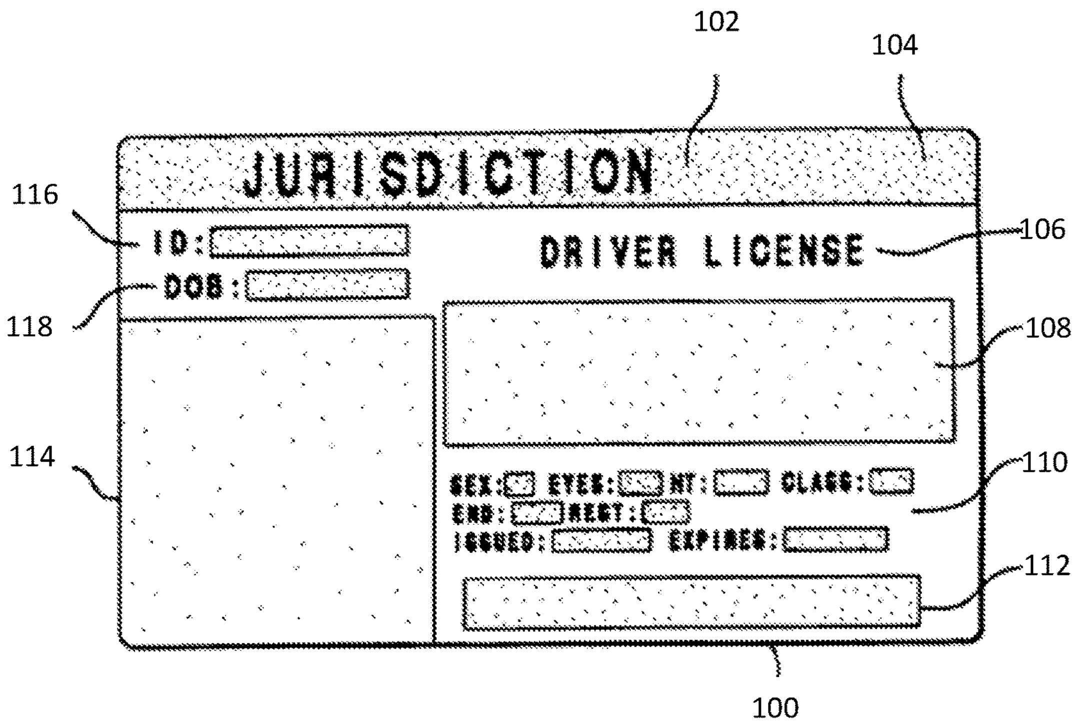
FIG. 1 shows a first side of an identification document, according to some embodiments.

FIG. 1 shows a first side of an identification document 100, according to some embodiments. The illustrated embodiment can be representative of a driver's license document, such as, but not limited to, a driver's license document in North America. It is to be appreciated that the identification document can be a document other than a driver's license, and that the driver's license is intended to be an example. It is to be appreciated that the identification document 100 does not have to be a physical identification document, but in some embodiments can be an electronic document such as, but not limited to, a mobile driver's license or the like. Additionally, the document can be applicable in a location other than North America. It is also to be appreciated that the location and text can vary according to the particular identification document 100.

The identification document 100 can include a variety of information identifying a subject of the identification document 100. For example, the identification document 100 can include an issuing jurisdiction 102. An image 104 such as, but not limited to, a graphic or other logo indicative of the issuing jurisdiction 102 can be included on the identification document 100. In some embodiments, the identification document 100 can include an identifier 106 indicating what type of identification document 100 is shown.

The identification document 100 can include various information data elements such as, but not limited to, a name and address 108 of the registered owner of the identification document 100, one or more identifying details 110 about the registered owner of the identification document 100. The details 110 can include, but are not limited to, sex, eye color, height, driver class, issue date, expiration date, or the like.

In some embodiments, the identification document 100 can include a signature 112 of the registered owner.

In some embodiments, the identification document 100 can include a photograph 114 of the registered owner.

In some embodiments, the identification document 100 can include an identification number 116. The identification number 116 can be, for example, a unique identifier that is associated with the registered owner of the identification document 100.

In some embodiments, the identification document 100 can include a birthdate 118 of the registered owner.

It is to be appreciated that one or more features of the identification document 100 shown on the frontside of the identification document 100 can be alternatively, or additionally, located on the backside (FIG. 2) of the identification document 100.

Figure 2:
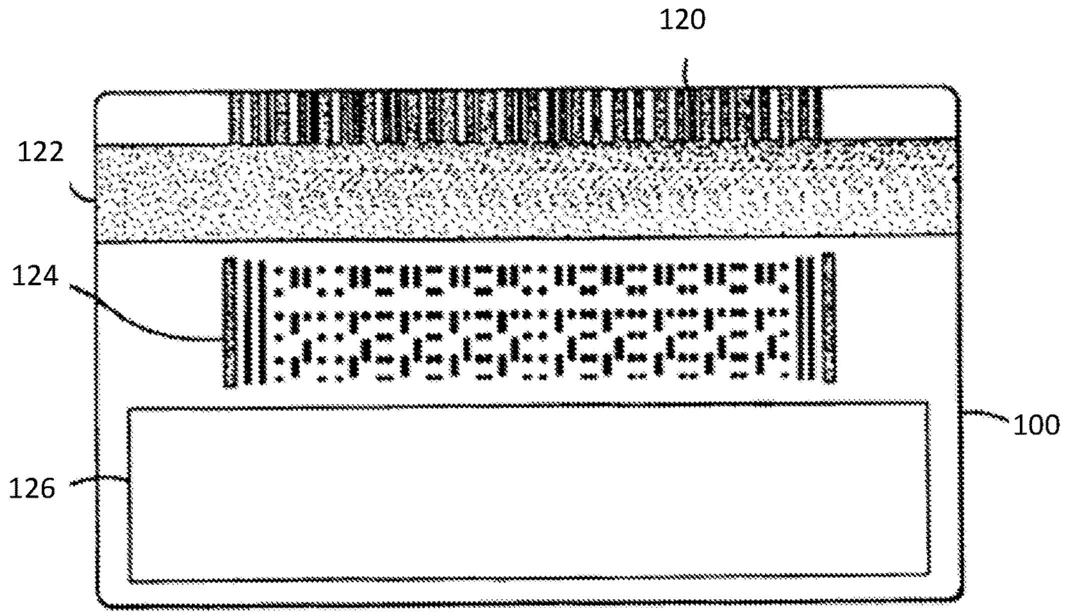
FIG. 2 shows a second side of the identification document of FIG. 1, according to some embodiments.

FIG. 2 shows a second side of the identification document 100 of FIG. 1, according to some embodiments.

In some embodiments, the identification document 100 can include one or more of a 1D barcode 120, a magnetic strip 122, a 2D barcode 124, and text 126 associated with the particular jurisdiction responsible for issuing the identification document 100. The 1D barcode 120, magnetic strip 122, or the 2D barcode 124 can be used to encode information (such as the personal information displayed on the frontside (FIG. 1) of the identification document 100). The 1D barcode 120, magnetic strip 122, the 2D barcode 124, captured images of the identification document, other forms of media that may be available for the identification document 100 (e.g., a smart chip, an RFID, an NFC feature, or the like) generally include machine readable formats for the encoded information. The 1D barcode 120, magnetic strip 122, the 2D barcode 124, captured images of the identification document, other forms of media that may be available for the identification document 100 (e.g., a smart chip, an RFID, an NFC feature, or the like) can be used to help prevent the use of fake identification. The 1D barcode 120, magnetic strip 122, the 2D barcode 124, captured images of the identification document, other forms of media that may be available for the identification document 100 (e.g., a smart chip, an RFID, an NFC feature, or the like) can be used to authenticate the identification document 100 and to confirm the presenter of the identification document 100 is the registered owner so as to safeguard a party verifying the identification document 100 before proceeding with a transaction such as, but not limited to, a retailer, financial institution, or the like.

As counterfeiters continue to become more sophisticated, they may attempt to apply a working 1D barcode 120, magnetic strip 122, 2D barcode 124, or printed information to attempt to change data or certain data element identifiers of the identification document 100 to enable a counterfeit document to be verified as authenticated, to enable the counterfeit document to be accepted, or to permit a transaction to proceed using the counterfeit document (along with combinations thereof). The systems and methods described herein are capable of identifying such counterfeit documents to prevent the continuing reuse of such a counterfeit document. In some embodiments, advantageously, if a document issuer changes the 1D barcode 120, magnetic strip 122, the 2D barcode 124, or printed information without updating the verification systems, the systems and methods described herein can also capture such modifications and flag for updates.

It is to be appreciated that one or more features of the identification document 100 shown on the backside of the identification document 100 can be alternatively, or additionally, located on the frontside (FIG. 1) of the identification document 100.

Moreover, the example in FIGS. 1-2 depicts a card having front and back sides. It is to be appreciated that the identification document 100 can include a single sided version as well. In some embodiments, the identification document 100 can include an electronic version or a paper version. In some embodiments, the electronic version can be stored in, for example, a digital wallet or a digital identification application, combinations thereof, or the like. In some embodiments, the identification document 100 can be an electronic image captured of a paper document. The systems and methods described herein are capable of use regardless of the medium in which the identification document 100 is fixed.

Figure 3:
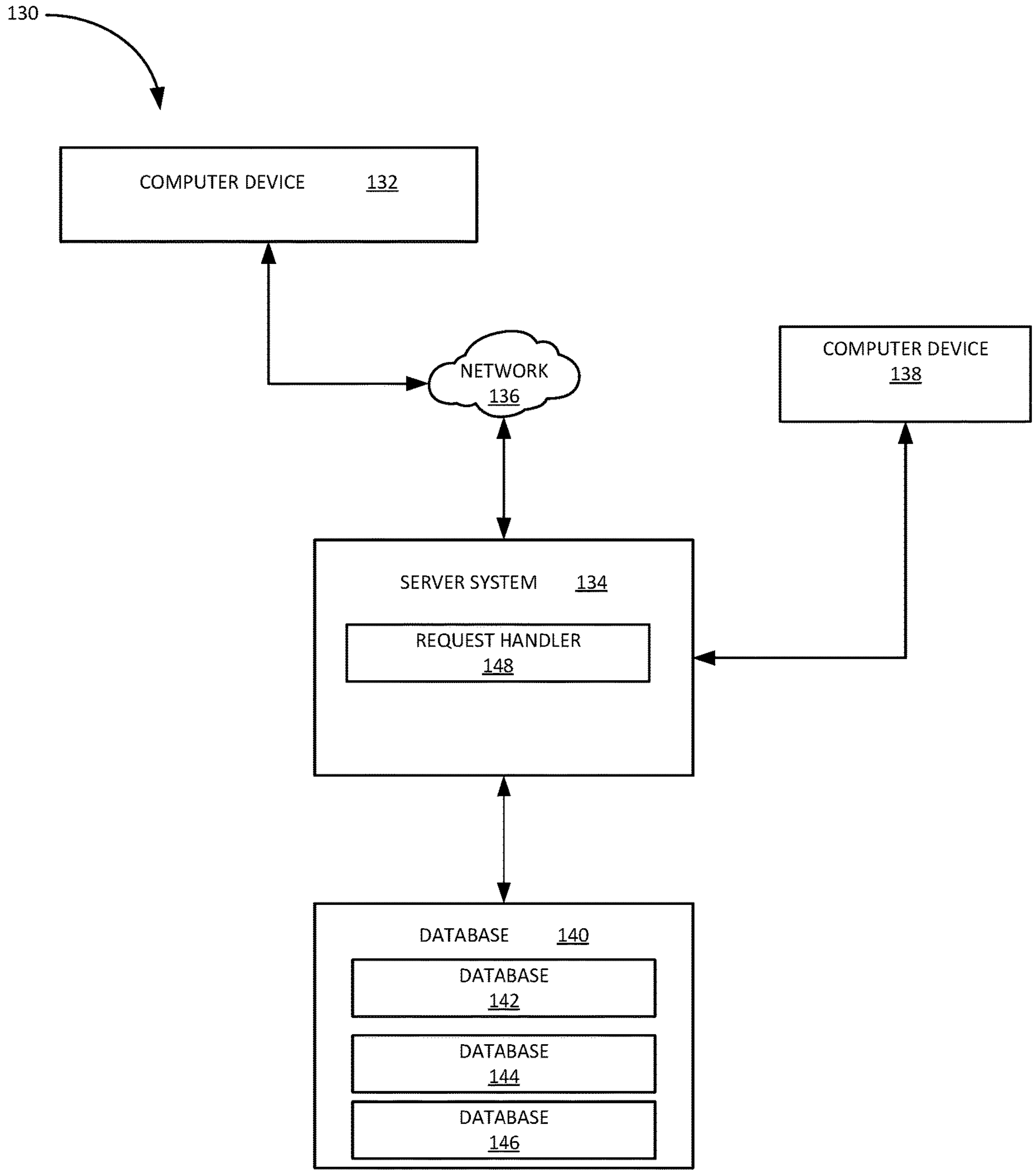
FIG. 3 shows a system for confirming an authenticity of an identification document (e.g., the identification document of FIGS. 1-2), according to some embodiments.

FIG. 3 shows a system 130 for authorizing a transaction using an identification document (e.g., the identification document 100 of FIGS. 1-2), according to some embodiments. In some embodiments, the system 130 can be described as confirming authenticity of the identification document 100. In some embodiments, the system 130 can be described as identifying potentially fraudulent identification documents. In some embodiments, the system 130 can be described as determining whether a transaction should be authorized. It is to be appreciated that the system 130 can be used for various capacities as described in additional detail herein. In some embodiments, the system 130 can be used to identify a portion of the identification document 100, without completing any further analysis. For example, the system 130 can be used to output portions of the identification document 100 and output the corresponding portion as identified for use by another system or method in verifying the authenticity or potentially fraudulent status of the identification document 100. In some embodiments, the system 130 can provide multiple outputs about the identification document, the person presenting the identification document, the device used to present the identification document, combinations thereof, or the like.

The system 130 can include a plurality of computing devices 132 in electronic communication with a server 134 via a network 136, according to some embodiments. The server 134 can be in electronic communication with one or more computing devices 138 via the network 136, according to some embodiments. It is to be appreciated that the computing devices 132 are not able to communicate directly with the one or more computing devices 138 via the network 136.

In some embodiments, the computing devices 132 can be in electronic communication with another device such as, but not limited to, a scanner or the like. In some embodiments, the scanner can be used to capture the identification document 100. In some embodiments, the scanner can be a separate device from the computing devices 132. In some embodiments, the scanner can be a part of the computing devices 132. In some embodiments, the scanner could be a mobile device, a mobile identification application that is presenting the identification document, combinations thereof, or the like. In some embodiments, a first of the computing devices 132 can request a second of the computing devices 132 to collect information for the first of the computing devices 132. For example, in some embodiments, a web server can send a text message to a user's mobile device with a hyperlink for the user to click to permit the user to use the mobile device to scan the barcode, take an image of an ID, take a selfie, combinations thereof, or the like.

In some embodiments, the computing devices 132 can submit information obtained from the identification document 100, or a copy of the authentication document 100 itself, to the server 134. The server 134 is configured to verify an authenticity of the authentication document 100 or to determine whether the authentication document 100 is potentially fraudulent, to determine whether a transaction should be approved, combinations thereof, or the like. In some embodiments, the server 134 can be configured to output a portion of the data identified within the identification document 100. In some embodiments, the server 134 can provide multiple outputs about the identification document, the person presenting the identification document, the device used to present the identification document, combinations thereof, or the like. In some embodiments, even outputting the data without confirming the authenticity of the identification document 100 can be referred to as verifying the identification document 100.

In some embodiments, the computing devices 132 can be configured to submit a versioned request. That is, the computing devices 132 can include a specific version to be used to complete the identification verification. The version included can serve as an instruction for the server 134 in how to complete the identification verification of the received identification document 100. In some embodiments, the versioned request can include instructions for what the response should contain and in what format the response is expected to be. In some embodiments, there can be a plurality of different versions accessible by the computing devices 132, and each of the computing devices 132 can select which version to implement. In some embodiments this can, for example, provide for flexibility in how users of the computing devices 132 develop their system and allow the computing devices 132 to continue to function correctly while the server 134 is updated with improvements, new features, to leverage different data analyzers in verifying the identification document 100, combinations thereof, or the like, without requiring updates to the computing devices 132. In some embodiments, different application programming interfaces (APIs) can be utilized that correspond to the type of the identification document 100 being analyzed and have corresponding versioned requests.

The server 134 can be connected in electronic communication with one or more databases 140. For example, in some embodiments, a database 142 can be present to store authentication information for the computing devices 132, a database 144 can be present to store conversion information for how to normalize and format the versioned requests, and a database 146 can be present to store responses to prior requests that may be leveraged again instead of submitting new data requests each time a versioned request is received by the server 134.

The server 134 can include a request handler 148, according to some embodiments. The request handler 148 is configured to receive the versioned requests from the computing devices 132, the computing devices 138, or a combination of the computing devices 132 and the computing devices 138, determine what data requests have been completed or need to be completed, make the appropriate data requests, receive the corresponding data responses, and output a normalized or formatted response to the computing devices 132, the one or more computing devices 138, or combinations thereof. In some embodiments, an asynchronous system can output a request identifier for the computing devices 132 and the one or more computing devices 138 to use to poll whether the versioned request is available. For example, in some embodiments, the request handler 148 can receive a versioned request and determine whether the computing devices 132 and the one or more computing devices 138 making the request are authorized to receive a response. In some embodiments, if the computing devices 132 and the one or more computing devices 138 making the request are not authorized, the request handler 148 can output an error message to the computing devices 132 and the one or more computing devices 138 as a failure notification for display to a user of the computing devices 132. In some embodiments, if the computing devices 132 is authorized, the request handler 148 can determine whether the requested information is already present in a response repository. In some embodiments, the request handler 148 can determine whether one or more data requests that are needed to obtain the requested information have been made, or need to be made. The request handler 148 can then make appropriate requests to the one or more computing devices 138 based on the request made. In some embodiments, once the appropriate responses are received, the request handler 148 can format the information according to a normalized format based on the versioned request and output the formatted response to the computing devices 132 and the one or more computing devices 138.

The server 134 can be in electronic communication with one or more computing devices 138. The one or more computing devices 138 can be used to complete various stages of the identification verification. In some embodiments, the one or more computing devices 138 can correspond to various identification review providers. In some embodiments, the one or more computing devices 138 can be referred to as one or more data analyzers. In some embodiments, the computing devices 132 or the one or more computing devices 138 can be an external computing device, an internal computing device, or an internal process running within the server 134. The one or more computing devices 138 can be configured to complete different tasks within the verification process using the identification document 100 or manually entered information. In some embodiments, the one or more computing devices 138 can include different versions of the same data analyzer. For example, in some embodiments, the one or more computing devices 138 can include a first data analyzer that utilizes a first set of processes and the one or more computing devices 138 can include a second data analyzer that utilizes a second set of processes that is different than the first set of processes, but provides similar functionality. In some embodiments, the first and second data analyzers could have different costs associated with utilization of the data analyzer. As such, different systems that develop the computing devices 132 may choose to utilize the different data analyzers depending upon a significance of the identification document 100 validation result or preference of one data analyzer over another.

For example, in some embodiments, the significance of the result can be relatively lesser when verifying someone's age for a transaction than if verifying someone's identity for making a large purchase such as, but not limited to, purchase of real property or the like. For example, in some embodiments, the results of one data analyzer may be seen as returning better results over another data analyzer.

In some embodiments, the one or more computing devices 138 can include different types of data analyzers. In some embodiments, the one or more computing devices 138 can include data analyzers having different purposes (i.e., for verifying a name on the identification document 100, for verifying a picture on the identification document 100, etc.). In some embodiments, the one or more computing devices 138 can include one or more data analyzers configured to, for example, confirm whether the identification document 100 is valid; parse and remove personal information (e.g., name, address, gender, eye color, combinations thereof, or the like) retrieved from the identification document 100; validate a name and address of the identification document 100; verify whether an image from the computing devices 132 matches an image on the identification document 100 (e.g., verify a self-photograph ("selfie") of an individual matches the photograph on the identification document 100); analyze a risk of the individual associated with the identification document 100; verify whether the individual is on one or more lists (e.g., a watch list, a criminal list, a banned person list, combinations thereof, or the like); confirm one or more details of the computing devices 132 having submitted the request; verification among multiple data analyzers (e.g., does information obtained from an optical character recognition (OCR) of the identification document 100 match information obtained from a barcode or other code on the identification document 100); combinations thereof, or the like. As noted above, these are examples of the data analyzers on the one or more computing devices 138. The functionalities can be combined into a single data analyzer; split across multiple data analyzers; included in different versions of the data analyzers; combinations thereof, or the like.

In some embodiments, the one or more data analyzers can be prioritized for a given versioned request. For example, the versioned request can include specific data analyzers to be used in a request, while in other instances, the versioned request can indicate an order of selection of the one or more data analyzers. For example, which data analyzer to use if one or more of the others are not available. In some embodiments, the one or more data analyzers chosen are based on the version of the versioned requests. In some embodiments, the one or more data analyzers are chosen based on a pre-configuration based on what is needed to complete the versioned request. In some embodiments, the one or more data analyzers are chosen based on a pre-configuration selection by the creators of the application on the computing devices 132.

In some embodiments, the network 136 can be representative of, for example, the Internet, an intranet, or any combination thereof.

In some embodiments, the computing devices 132 can utilize a user interface that is independent of which one or more computing devices 138 complete a verification because of the request handler 148 being configured to control the appropriate selection of the one or more computing devices 138 based on the versioned request from the computing devices 132.

In some embodiments, the user interface on the computing devices 132 can be modified without necessitating any modifications to the one or more computing devices 138. In some embodiments, the request handler 148 is configured to control the appropriate formatting of the response based on the versioned request, and accordingly, the user interface can be updated without one or more computing devices 138 being modified to account for the changes. As a result, in some embodiments, the request handler 148 ensures that the computing devices 132 and the one or more computing devices 138 can be controlled independently of each other without causing the identification services to break.

In some embodiments, the request handler 148 can operate in a synchronous mode or an asynchronous mode. For example, in some embodiments, the asynchronous mode can include polling for responses from the one or more computing devices 138, but may indicate to another one or more computing devices 138 or the computing devices 132 that the request is in progress, but has not been completed, and to try back later. In some embodiments, the synchronous mode waits for a response from the one or more computing devices 138 before continuing to the next request.

To provide additional context for various aspects of the present disclosure, the following discussion is intended to provide a brief, general description of a suitable computing environment in which the various aspects may be implemented. While some exemplary embodiments relate to the general context of computer-executable instructions that may run on one or more computers, those skilled in the art will recognize that the embodiments also may be implemented in combination with other program modules and/or as a combination of hardware and software.

Generally, program modules include routines, programs, components, data structures, etc., that perform particular tasks or implement particular abstract data types. Moreover, those skilled in the art will appreciate that aspects of the disclosure may be practiced with other computer system configurations, including single-processor or multiprocessor computer systems, minicomputers, mainframe computers, as well as personal computers, hand-held wireless computing devices, microprocessor-based or programmable consumer electronics, and the like, each of which can be operatively coupled to one or more associated devices. Aspects of the disclosure may also be practiced in distributed computing environments where certain tasks are performed on a user device or by remote processing devices that are linked through a communications network. In a distributed computing environment, program modules may be located in both local and remote memory storage devices.

A computer may include a variety of computer readable media. Computer readable media may be any available media that can be accessed by the computer and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which may be used to store the desired information and which may be accessed by the computer.

An exemplary environment for implementing various aspects may include a computer that includes a processing unit, a system memory and a system bus. The system bus couples system components including, but not limited to, the system memory to the processing unit. The processing unit may be any of various commercially available processors. Dual microprocessors and other multi-processor architectures may also be employed as the processing unit.

The system bus may be any of several types of bus structure that may further interconnect to a memory bus (with or without a memory controller), a peripheral bus, and a local bus using any of a variety of commercially available bus architectures. The system memory may include read only memory (ROM) and/or random access memory (RAM). A basic input/output system (BIOS) is stored in a non-volatile memory such as ROM, EPROM, EEPROM, which BIOS contains the basic routines that help to transfer information between elements within the computer, such as during start-up. The RAM may also include a high-speed RAM such as static RAM for caching data.

The computer may further include an internal hard disk drive (HDD) (e.g., EIDE, SATA), which internal hard disk drive may also be configured for external use in a suitable chassis, a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive may be connected to the system bus by a hard disk drive interface, a magnetic disk drive interface and an optical drive interface, respectively. The interface for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods herein.

A number of program modules may be stored in the drives and RAM, including an operating system, one or more application programs, other program modules and program data. All or portions of the operating system, applications, modules, and/or data may also be cached in the RAM. It is appreciated that the embodiments may be implemented with various commercially available operating systems or combinations of operating systems.

It is also within the scope of the disclosure that a user may enter commands and information into the computer through one or more wired/wireless input devices, for example, a touch-screen, a keyboard and a pointing device, such as a mouse. Other input devices may include a microphone (functioning in association with appropriate language processing/recognition software as known to those of ordinary skill in the technology), an IR remote control, a joystick, a game pad, a stylus pen, or the like. These and other input devices are often connected to the processing unit through an input device interface that is coupled to the system bus, but may be connected by other interfaces, such as a parallel port, an IEEE 1394 serial port, a game port, a USB port, an IR interface, etc.

A display monitor or other type of display device may also be connected to the system bus via an interface, such as a video adapter. In addition to the monitor, a computer may include other peripheral output devices, such as speakers, printers, etc.

The computer may operate in a networked environment using logical connections via wired and/or wireless communications to one or more remote computers. The remote computer(s) may be a workstation, a server computer, a router, a personal computer, a portable computer, a personal digital assistant, a cellular device, a microprocessor-based entertainment appliance, a peer device or other common network node, and may include many or all of the elements described relative to the computer. The logical connections depicted include wired/wireless connectivity to a local area network (LAN) and/or larger networks, for example, a wide area network (WAN). Such LAN and WAN networking environments are commonplace in offices, and companies, and facilitate enterprise-wide computerized networks, such as intranets, all of which may connect to a global communications network such as the Internet.

The computer may be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi (such as IEEE 802.11x (a, b, g, n, etc.)) and Bluetooth™ wireless technologies. Thus, the communication may be a predefined structure as with a conventional network or simply an ad hoc communication between at least two devices.

The system may also include one or more server(s). The server(s) may also be hardware and/or software (e.g., threads, processes, computing devices). The servers may house threads to perform transformations by employing aspects of the disclosure, for example. One possible communication between a client and a server may be in the form of a data packet adapted to be transmitted between two or more computer processes. The data packet may include a cookie and/or associated contextual information, for example. The system may include a communication framework (e.g., a global communication network such as the Internet) that may be employed to facilitate communications between the client(s) and the server(s).

Figure 4:
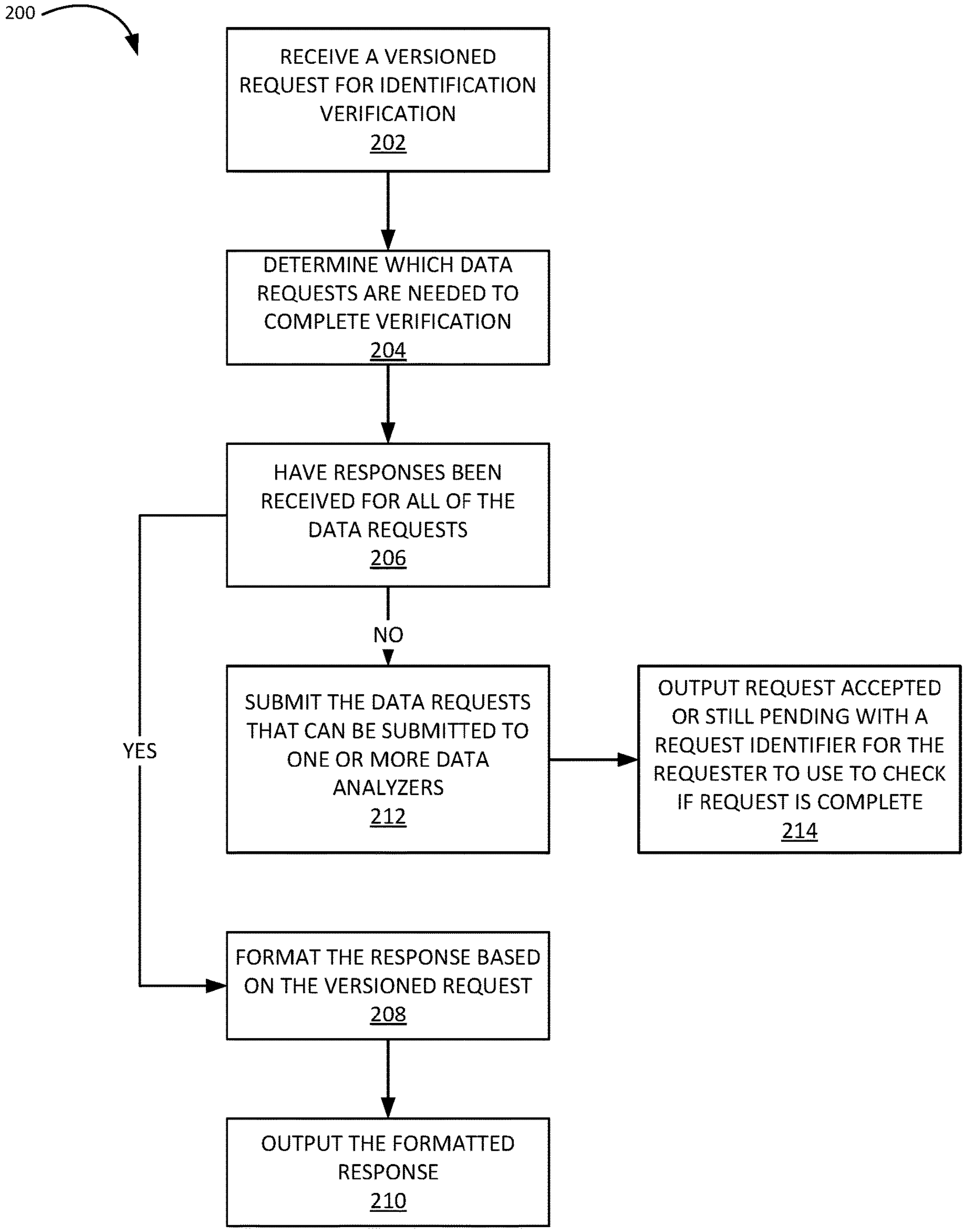
FIG. 4 is a flowchart for a method of verifying an identification document (e.g., the identification document of FIG. 1), according to some embodiments.

FIG. 4 is a flowchart for a method 200 of verifying an identification document (e.g., the identification document 100 of FIG. 1), according to some embodiments. In some embodiments, the method 200 can be referred to as an asynchronous method. In some embodiments, a synchronous method can be used. In some embodiments, part of the method may be asynchronous and other parts of the method can be synchronous. In some embodiments, part of the process can alternatively use timers or event notification methods.

At block 202, the method 200 includes receiving a versioned request for verification of an identification document. In some embodiments, the method 200 can include verifying an authentication of the caller submitting the versioned request before block 204.

At block 204, the method 200 includes determining which data requests are needed to respond to the versioned request.

At block 206, the method 200 includes determining whether responses have been received for all of the data requests.

At block 208, in response to determining the responses have been received for all of the data requests by block 206, the method 200 includes formatting the response according to a format corresponding to the versioned request by the request handler.

At block 210, the method 200 includes outputting the formatted response.

At block 212, in response to determining the responses have not been received for all of the data requests, the method 200 includes submitting the data requests that can be submitted to one or more data analyzers (e.g., one or more computing devices 138 in FIG. 3) by the response handler (e.g., the request handler 148 in FIG. 3) and response back that the request was accepted or is still pending.

At block 214, the method 200 includes outputting a request accepted notification or an indication that the request is still pending, along with a request identifier so the requester can continue to check whether the request is complete. In some embodiments, the method 200 can wait for the requesters next check and the wakeup notifications can be sent to the requester to continue using, for example, push notifications, raising events, combinations thereof, or the like, upon receipt of a response. In some embodiments, the method 200 can use other techniques for continuing operation in accordance with the asynchronous principles described in this Specification.

In a synchronous method, block 214 could alternatively block further execution until the request is completed, then return to block 204 to continue gathering responses needed from all data analyzers.

Figure 5:
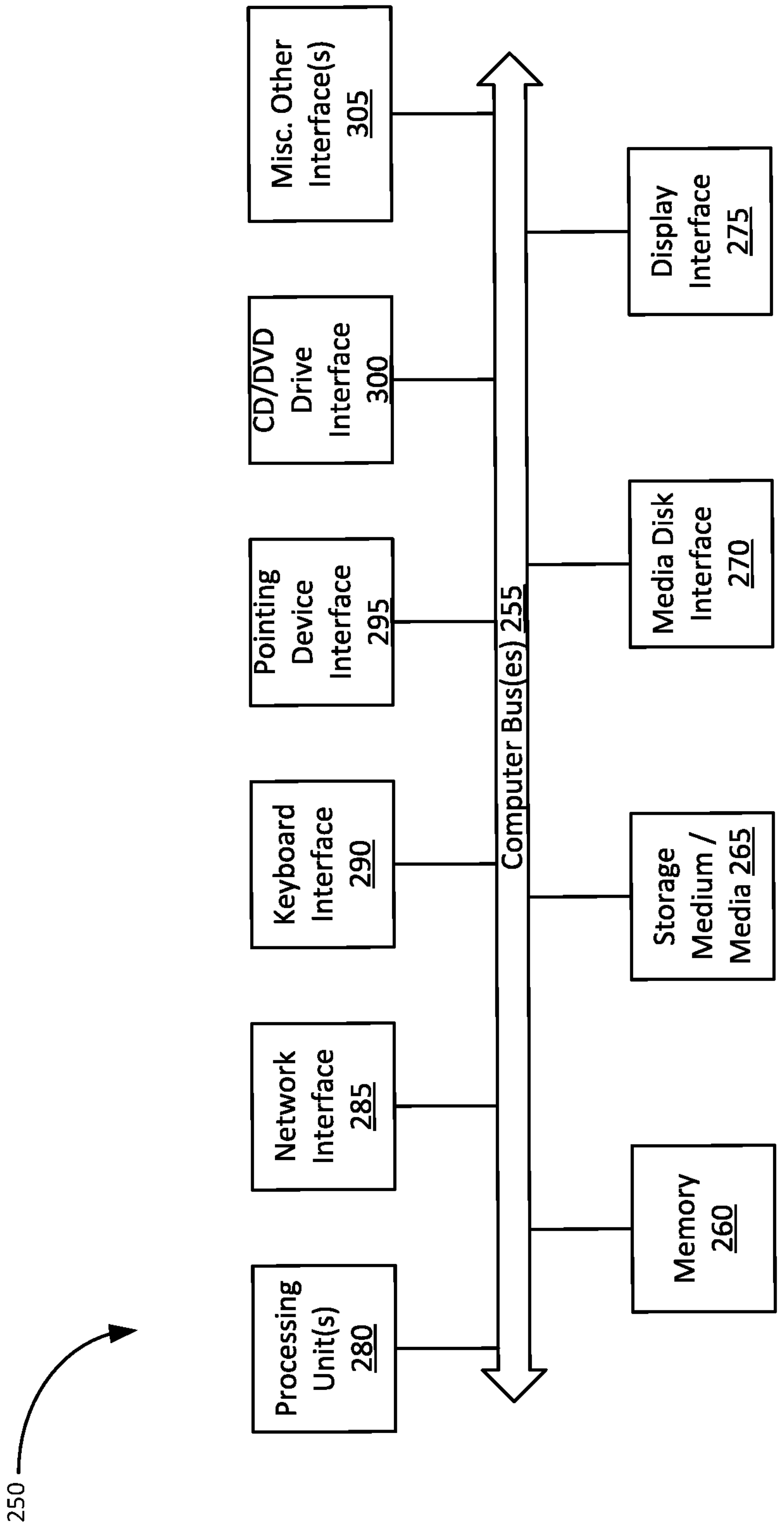
FIG. 5 is a block diagram illustrating an internal architecture of an example of a computer, according to some embodiments.

FIG. 5 is a block diagram illustrating an internal architecture of an example of a computer, such as the computing devices 132 (FIG. 3), the server 134 (FIG. 3), or the one or more computing devices 138 (FIG. 3), according to some embodiments. A computer as referred to herein refers to any device with a processor capable of executing logic or coded instructions, and could be a server, personal computer, set top box, smart phone, pad computer or media device, to name a few such devices. As shown in the example of FIG. 5, internal architecture 250 includes one or more processing units (also referred to herein as CPUs) 280, which interface with at least one computer bus 255. Also interfacing with computer bus 255 are persistent storage medium/media 265, network interface 285, memory 260, e.g., random access memory (RAM), run-time transient memory, read only memory (ROM), etc., media disk drive interface 270 as an interface for a drive that can read and/or write to media including removable media such as floppy, CD ROM, DVD, etc. media, display interface 275 as interface for a monitor or other display device, keyboard interface 290 as interface for a keyboard, pointing device interface 295 as an interface for a mouse or other pointing device, and miscellaneous other interfaces not shown individually, such as parallel and serial port interfaces, a universal serial bus (USB) interface, and the like.

Memory 260 interfaces with computer bus 255 so as to provide information stored in memory 260 to CPU 280 during execution of software programs such as an operating system, application programs, device drivers, and software modules that comprise program code, and/or computer executable process operations, incorporating functionality described herein, e.g., one or more of process flows described herein. CPU 280 first loads computer executable process operations from storage, e.g., memory 260, storage medium/media 265, removable media drive, and/or other storage device. CPU 280 can then execute the stored process operations in order to execute the loaded computer-executable process operations. Stored data, e.g., data stored by a storage device, can be accessed by CPU 280 during the execution of computer-executable process operations.

Persistent storage medium/media 265 is a computer readable storage medium(s) that can be used to store software and data, e.g., an operating system and one or more application programs. Persistent storage medium/media 265 can also be used to store device drivers, such as one or more of a digital camera driver, monitor driver, printer driver, scanner driver, or other device drivers, web pages, content files, playlists and other files. Persistent storage medium/media 265 can further include program modules and data files used to implement one or more embodiments of the present disclosure.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Examples of computer-readable storage media include, but are not limited to, any tangible medium capable of storing a computer program for use by a programmable processing device to perform functions described herein by operating on input data and generating an output. A computer program is a set of instructions that can be used, directly or indirectly, in a computer system to perform a certain function or determine a certain result. Examples of computer-readable storage media include, but are not limited to, a floppy disk; a hard disk; a random access memory (RAM); a read-only memory (ROM); a semiconductor memory device such as, but not limited to, an erasable programmable read-only memory (EPROM), an electrically erasable programmable read-only memory (EEPROM), Flash memory, or the like; a portable compact disk read-only memory (CD-ROM); an optical storage device; a magnetic storage device; other similar device; or suitable combinations of the foregoing.

In some embodiments, hardwired circuitry may be used in combination with software instructions. Thus, the description is not limited to any specific combination of hardware circuitry and software instructions, nor to any source for the instructions executed by the data processing system.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

In some embodiments, a computer device, including: a memory; and a processor, wherein the processor is configured to: receive a versioned request for verification of an identification document; determine data requests needed to respond to the versioned request; determine whether all responses have been received for the data requests; in response to determining all responses have not been received for the data requests, determining whether all data requests have been submitted; in response to determining all data requests have not been submitted, submitting at least one of the remaining data requests that can be submitted to one or more data analyzers; in response to determining all responses have been received for the data requests, formats the response according to a format corresponding to the versioned request; and outputs the formatted response.

In some embodiments, a computer device, wherein the processor is configured to verify a user corresponding to the versioned request prior to determining the data requests needed to respond to the versioned request.

In some embodiments, a computer device, wherein the one or more data analyzers are separate from the computer device and connected to a server in electronic communication via a network.

In some embodiments, a computer device, wherein the processor is configured to prioritize the one or more data analyzers.

In some embodiments, a computer device, wherein the one or more data analyzers are replaceable without modification of the versioned request and the corresponding formatted response.

In some embodiments, a computer device, wherein the versioned request and the corresponding formatted response are modifiable without modification to the one or more data analyzers.

In some embodiments, a computer device, wherein the processor is configured in an asynchronous mode.

In some embodiments, a computer device, wherein the processor is configured to continue to poll for responses from the one or more data analyzers when one or more of the one or more data analyzers is not available.

In some embodiments, a computer device, wherein the processor is configured to output an indicator along with the formatted response to indicate to a user to submit the request later.

In some embodiments, a computer device, wherein the processor is configured in a synchronous mode.

In some embodiments, a computer device, wherein the processor is configured to wait for each response from the one or more data analyzers until each response is received.

In some embodiments, a computer device, including a response repository, wherein the processor is configured to determine whether a response has already been received for the data requests in the response repository prior to submitting the data requests to the one or more data analyzers, wherein in response to determining the response has already been received for the data requests, the respective data request is not sent to the one or more data analyzers.

In some embodiments, a computer device, including storing the responses that have been received for the data requests.

In some embodiments, a method, including: receiving a versioned request for verification of an identification document; determining data requests needed to respond to the versioned request; determining whether responses have been received for the data requests; in response to determining the responses have not been received for the data requests, determining whether all data requests have not been submitted and submitting at least one of the remaining data requests to one or more data analyzers; in response to determining the responses have been received for the data requests, formatting the response according to a format corresponding to the versioned request; and outputting the formatted response.

In some embodiments, a method, verifying a user corresponding to the versioned request before determining the requests needed to respond to the versioned request.

In some embodiments, a method, including prioritizing the one or more data analyzers based on the versioned request.

In some embodiments, a method, including replacing one or more of the one or more data analyzers without modifying the versioned request or the formatted response.

In some embodiments, a method, including modifying the versioned request and the formatted response without modifying the one or more data analyzers.

In some embodiments, a method, including storing responses received for the data requests.

In some embodiments, a non-transitory computer readable storage medium, including instructions thereon that, when executed, cause a processor to perform a method, including: receiving a versioned request for verification of an identification document; determining data requests needed to respond to the versioned request; determining whether responses have been received for the data requests; in response to determining the responses have not been received for the data requests, determining whether all data requests have not been submitted and submitting at least one of the remaining data requests to one or more data analyzers; in response to determining the responses have been received for the data requests, formatting the response according to a format corresponding to the versioned request; and outputting the formatted response.

What is claimed is:

1. A computer device, comprising:

a memory; and a processor, wherein the processor is configured to execute a request handler, wherein the request handler is configured to:

receive a versioned request for verification of an identification document, wherein the versioned request comprises at least one instruction specifying a format for a response to the versioned request and content to be included in the response;

determine data requests needed to respond to the versioned request;

control selection of the one or more data analyzers and formatting of the response based on the versioned request such that a computing device submitting the versioned request and the one or more data analyzers are controlled independently of each other;

determine whether all responses have been received for the data requests;

in response to determining all responses have not been received for the data requests, submit the data requests that can be submitted to one or more data analyzers;

receive corresponding data responses from the one or more data analyzers;

in response to determining all responses have been received for the data requests, format the response to include the content and according to the format specified by the versioned request; and output the formatted response.

2. The computer device of claim 1, wherein the processor is configured to verify a requester corresponding to the versioned request prior to determining the data requests needed to respond to the versioned request and at least one of outputs an error or ignores the request if the requester fails verification.

3. The computer device of claim 1, wherein the one or more data analyzers are separate from the computer device and connected to a server in electronic communication via a network.

4. The computer device of claim 1, wherein the processor is configured to prioritize the one or more data analyzers.

5. The computer device of claim 1, wherein the one or more data analyzers are replaceable without modification of the versioned request and the corresponding formatted response.

6. The computer device of claim 1, wherein the versioned request and the corresponding formatted response are modifiable without modification to the one or more data analyzers.

7. The computer device of claim 1, wherein the processor is configured in an asynchronous mode.

8. The computer device of claim 7, wherein the processor is configured to continue to poll for responses from the one or more data analyzers when one or more of the one or more data analyzers is not available.

9. The computer device of claim 7, wherein the processor is configured to output an indicator along with the formatted response to indicate to a user to submit the request later.

10. The computer device of claim 1, wherein the processor is configured in a synchronous mode.

11. The computer device of claim 10, wherein the processor is configured to wait for each response from the one or more data analyzers until each response is received.

12. The computer device of claim 1, comprising a response repository, wherein the processor is configured to determine whether a response has already been received for the data requests in the response repository prior to submitting the data requests to the one or more data analyzers, wherein in response to determining the response has already been received for the data requests, the respective data request is not sent to the one or more data analyzers.

13. The computer device of claim 1, comprising storing the responses that have been received for the data requests.

14. The computer device of claim 1, wherein the at least one of the data requests that can be submitted to one or more data analyzers includes a versioned request.

15. A method, comprising:

receiving a versioned request for verification of an identification document, wherein the versioned request comprises at least one instruction specifying a format for a response to the versioned request and content to be included in the response;

determining data requests needed to respond to the versioned request;

controlling, by a request handler, selection of one or more data analyzers and formatting of the response based on the versioned request such that a computing device submitting the versioned request and the one or more data analyzers are controlled independently of each other;

determining whether responses have been received for the data requests;

in response to determining all responses have not been received for the data requests, submitting, by the request handler, the data requests that can be submitted to one or more data analyzers;

receiving, by the request handler, corresponding data responses from the one or more data analyzers;

in response to determining the responses have been received for the data requests, formatting the response to include the content and according to the format specified by the versioned request; and outputting the formatted response.

16. The method of claim 15, verifying a requester corresponding to the versioned request before determining the requests needed to respond to the versioned request and at least one of outputs an error or ignores the request if the requester fails verification.

17. The method of claim 15, comprising prioritizing the one or more data analyzers based on the versioned request.

18. The method of claim 15, comprising replacing one or more of the one or more data analyzers without modifying the versioned request or the formatted response.

19. The method of claim 15, comprising modifying the versioned request and the formatted response without modifying the one or more data analyzers.

20. The method of claim 15, comprising storing responses received for the data requests.

21. The method of claim 15, wherein the at least one of the data requests that can be submitted to one or more data analyzers includes a versioned request.

* * * * *